United States Patent
Paquelet (10) Patent No.: US 6,822,608 B2
(45) Date of Patent: Nov. 23, 2004

(54) METHOD FOR PASSIVE LOCALIZATION OF A TARGET AND AIR-AIR LOCALIZATION IN PARTICULAR

(75) Inventor: Stéphane Paquelet, Clichy (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/318,363

(22) Filed: Dec. 13, 2002

(65) Prior Publication Data

US 2003/0197644 A1 Oct. 23, 2003

(30) Foreign Application Priority Data

Dec. 14, 2001 (FR) .............................. 01 16239

(51) Int. Cl.⁷ .............................................. G01S 5/04
(52) U.S. Cl. ................................................ 342/449
(58) Field of Search ................... 342/449, 442, 342/430, 451

(56) References Cited

U.S. PATENT DOCUMENTS

| | | | | |
|---|---|---|---|---|
| 3,922,533 A | * | 11/1975 | Royal | 342/442 |
| 4,179,697 A | * | 12/1979 | Golinsky | 342/458 |
| 4,734,702 A | * | 3/1988 | Kaplan | 342/424 |
| 5,835,060 A | * | 11/1998 | Czarnecki et al. | 342/442 |
| 6,285,319 B1 | * | 9/2001 | Rose | 342/449 |

\* cited by examiner

*Primary Examiner*—Gregory C. Issing
(74) *Attorney, Agent, or Firm*—Oblon, Spivak, McClelland, Maier & Neustadt, P.C.

(57) ABSTRACT

This invention concerns a method for passive localization of a target (12) and air-air localization in particular.

This method includes a step for acquisition of the signal transmitted by the target using sensors equipping the carrier (11) and forming two interferometers. This step includes at least two independent measurement series carried out along separate trajectories. The method also includes a measurement processing step to estimate the parameters characterizing the target easily.

The invention applies in particular to the passive localization of a target whose transmission frequency varies in a narrow band.

7 Claims, 4 Drawing Sheets

METHOD FOR PASSIVE LOCALIZATION OF A TARGET AND AIR-AIR LOCALIZATION IN PARTICULAR

BACKGROUND OF THE INVENTION

1. Field of the Invention

This invention concerns a method for passive localization of a target, by a mobile surveillance system, for example an aircraft, carrying sensors. The invention applies in particular to the localization of targets whose signal transmission frequency is variable.

2. Description of the Related Art

The methods of passive localization of a target commonly used are based in particular on use of the Doppler effect. This type of method can only truly be used if the transmission frequency of the target is fixed. Otherwise, due to the variations in transmission frequency, it is impossible to determine the Doppler frequency easily.

On current aircraft the radar transmission systems with variable frequency are becoming more generalized and the use of methods based on determination of the Doppler frequency is therefore no longer efficient.

SUMMARY OF THE INVENTION

An objective of the invention is in particular to perform passive localization of a target whose transmission frequency is not necessarily fixed, but may be variable.

The invention therefore concerns a method for localization of a target by interferometric measurement on the signal received from the target. The signal transmitted by the target is acquired by detection means equipping a carrier. The method for localization of a target comprises at least two steps.

The first step is a measurement acquisition step which comprises at least two independent sequences for acquisition of the signal transmitted by the target. On each sequence the carrier follows a separate trajectory, with a non zero angle between the trajectories. These acquisition sequences are used to obtain independent measurement series.

The second step is a measurement processing step involving statistical processing. This processing is carried out on each measurement series to determine parameters characterizing the target, especially speed and distance parameters.

The particular advantage of the invention is that it can be used to estimate the target parameters, without the target having to transmit at fixed frequency.

The estimation of the target parameters offers the advantage of being carried out from a limited number of measurements.

Advantageously, use of a spherical coordinate system simplifies the expression of the theoretical model used, making it easier to estimate the target parameters.

The processing implemented by the method according to the invention is iterative. Advantageously, the target parameters can be accurately estimated by successive improvements.

BRIEF DESCRIPTION OF THE DRAWINGS

Other advantages and features of the invention will be clearer on reading the following description, illustrated by the attached figures representing in.

DETAILED DESCRIPTION OF THE PREFERRED INVENTION

Figure 1:
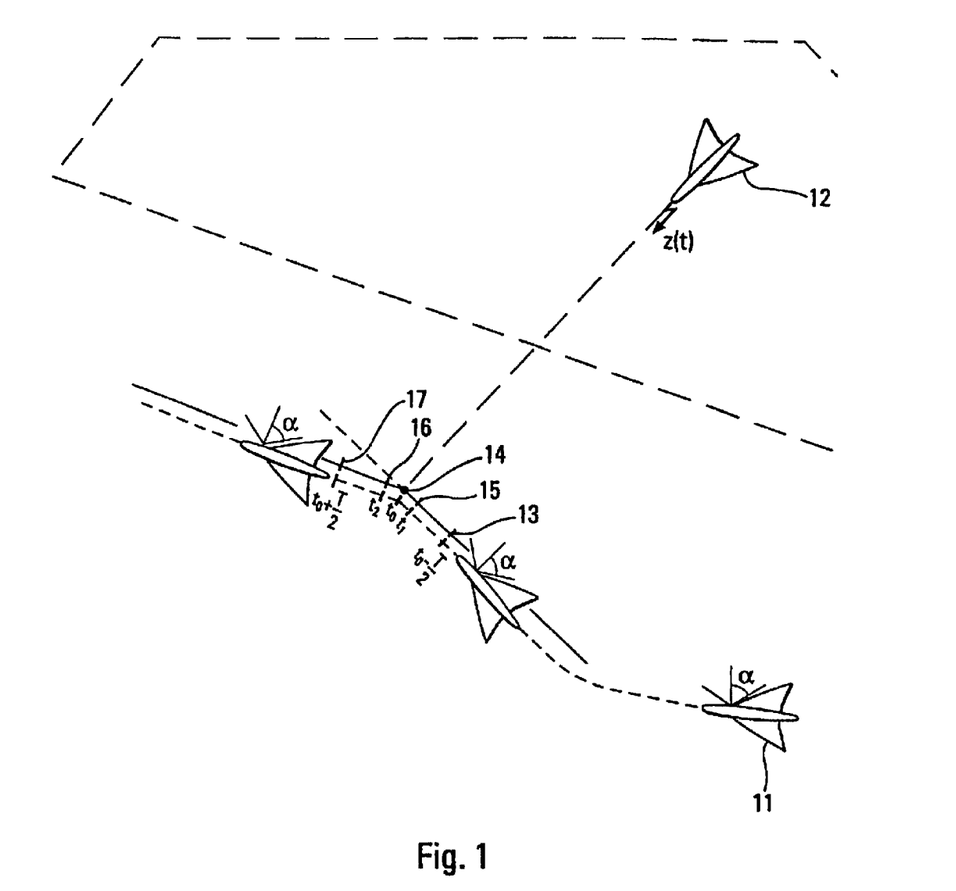
FIG. 1, an illustration of the measurement acquisition step.

FIG. 1 illustrates the execution of the measurement acquisition step included in the method according to the invention.

At some instant, the carrier aircraft 11 detects a target aircraft 12 moving at a speed $V_c$ and transmitting a radar signal. This target aircraft is flying at any altitude and in any direction, at a large distance from the carrier aircraft, for example more than 150 km away. After detecting the target aircraft, the carrier aircraft modifies its trajectory and moves from its initial position to position 13, enabling it to start the method according to the invention. It then carries out two measurement sequences of the signal z(t) received from the target. These sequences extend over two time intervals $$\left[t_0 - \frac{T}{2}, t_1\right]$$

and $$\left[t_2, t_0 + \frac{T}{2}\right].$$

The instants $t_1$ and $t_2$ bound the reference instant $t_0$ which corresponds to point 14 of the target parameter estimation. During each sequence the carrier follows a trajectory with a speed vector that is preferably constant.

The first sequence brings, at instant $t_1$, the carrier 11 near to point 15. The carrier then deviates its trajectory by an angle α, and starts the second sequence from instant $t_2$. Its trajectory takes it from point 16 to point 17.

The value of angle α is determined by the maximum opening angle of the reception devices. It also depends on the ability of the carrier aircraft to change bearing considering its speed. A change of bearing of approximately 30° is given as an example.

According to the method, the two trajectory portions corresponding to the two sequences are each traveled with a constant speed vector. One of them is preferably chosen perpendicular to the average direction of propagation of the signal transmitted by the target.

The initial relative position of the two aircraft 11 and 12 determines the chronological order of the trajectories. This order is unimportant for the implementation of the processing step of the method according to the invention, which follows the acquisition step. To save time, the carrier aircraft tries for example to first reach the trajectory closest to its initial trajectory.

Advantageously, to determine the target parameters the method according to the invention does not require a very large number of measurement results. The trajectory portions previously defined are therefore short in comparison with the target—carrier distance and to the speed of the carrier, for example respectively 150 km and 250 m/s. Consequently, the trajectory of the target can be considered as constant during the measurements.

Figure 2:
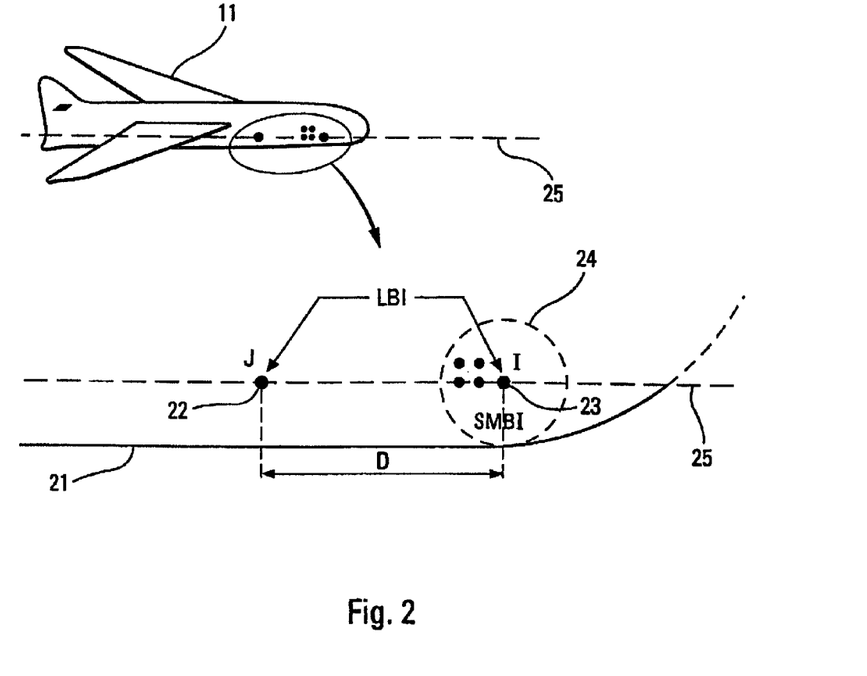
FIG. 2, illustration of a possible arrangement of sensors on the carrier aircraft.

FIG. 2, represents a possible arrangement of sensors on the carrier aircraft. The n sensors are arranged for example in two groups laterally along the fuselage 21.

The first group consists of two sensors 22 and 23 positioned at two points I and J along the longitudinal axis 25 of the carrier. The middle of segment IJ is called O. These two sensors are separated from each other by a distance D much greater than the wavelength of the signal received. The distance between the sensors may for example be as large as 4 meters. These two sensors are independent: the relative phase of their antennas has a calibration error which can be modeled by a slowly varying signal. They form the Large Base Interferometer (LBI) or more simply the "large base". The second group consists of other sensors arranged in an area 24, with a radius of about one meter. These sensors are very close to each other and the antennas composing them are calibrated in phase. Some of these sensors are positioned on an axis parallel to the axis of the fuselage 25 and others are each side of this axis.

This group of sensors forms the Small Base Interferometer (SMBI) or more simply the "small base".

Advantageously, one of the sensors composing the large base is also included in the composition of the small base. This limits the number of sensors employed.

Each group of sensors acts as an independent interferometer and supplies data concerning the phase difference of the signals z(t) received on its sensors. The carrier therefore collects phase information related to the measurements of the large base interferometer and phase information related to the measurements of the small base.

The signal z(t) transmitted by the target and received by each sensor on the carrier is a radar signal of frequency $f_0$. Of complex form, its temporal expression is modeled by the following relation:

$$z(t) = s(t)e^{2i\pi \int_0^t} + w(t) \quad (1)$$

In this relation s(t) is a signal in band ΔF, with ΔF approximately one megahertz for example and w(t) thermal noise considered as white Gaussian noise.

Calculations carried out elsewhere have shown that, since the signal received to noise ratio is considered as being much greater than 1, for example equal to +20 dB, we may write:

$$\begin{cases} |z(t)| \approx A(t) + \mathcal{R}(w(t)) \\ \arg(z(t)) \approx \varphi(t) + 2\pi f_0 t + \mathcal{I}(w(t)) \end{cases} \quad (2)$$

A(t) is a function of the amplitude of the transmitted signal and φ(t) a function of the direction of the received signal and of the phase of s(t).

$\mathcal{R}(w(t))$ and $\mathcal{I}(w(t))$ represent the real and imaginary parts of w(t).

In the expression of z(t) the amplitude term |z(t)| cannot be explained directly according to the target parameters. However, the phase term arg(z(t)) contains useful information concerning the localization of the target. In addition, this term can be accessed through measurements made by the sensors located on the carrier aircraft. The method according to the invention therefore uses this phase term.

The sensors forming the small base are used to obtain, at various instants t, the direction of arrival $\vec{\gamma}(t)$ of the signal, in elevation and bearing.

The two sensors I and J forming the large base provide information $\Delta\Phi_t^{LBI}$ equal to the phase difference of the signals received by each sensor. If the noise is ignored, $\Delta\Phi_t^{LBI}$ can be written as follows:

$$\Delta\Phi^{LBI}(t) = (\Phi_J - \Phi_I)(t) \quad (3)$$

$$= 2\pi \frac{f_t}{c}(d_1(t) - d_2(t)) + \underbrace{\varphi_2(f_t) - \varphi_1(f_t)}_{\delta\varphi(f_t)} \quad \text{modulo } 2\pi$$

with:

$f_t$ central frequency of the target signal at instant t, $d_1(t)$ and $d_2(t)$ the distance of each sensor to the transmission source of the target, $\delta\varphi(f_t)$ an unknown term, due to an uncontrolled delay between the two antennas which are not calibrated.

The expression "modulo 2π" is due to the fact that since the distance D between the sensors I and J is large, the dephasing $\Delta\Phi^{LBI}(t)$ ignores a difference of a whole number of wavelengths n×2π.

Assuming that the central frequency of the radar varies very little between two pulses, the transmitted signal can be considered as a narrow band signal, at least for the time required to take a measurement. In this case $\varphi_1(f_t)$ and $\varphi_2(f_t)$ have only negligible variations with time. We can then advantageously replace for $\Delta\Phi_t^{LBI}$ the expression $\Delta^2\Phi^{LBI}(t) = \Delta\Phi^{LBI}(t) - \Delta\Phi^{LBI}(t_0)$ of the variation of $\Delta\Phi^{LBI}(t)$ between $t_0$ and t. We therefore eliminate $\delta\varphi(f_t)$.

The quantities γ(t) and $\Delta_2\Phi_{LBI}(t)$ and are continuous functions of t. However, to determine the target parameters the method according to the invention uses series of values of γ(t) and $\Delta_2\Phi_{LBI}(t)$ measured at instants $t_n$ taken at regular time intervals ΔT in each of the intervals to $$\left[t_0 - \frac{T}{2}, t_1\right]$$

and $$\left[t_2, t_0 + \frac{T}{2}\right].$$

A given instant $t_n$ could for example take the value $t_n = t_1 - n.\Delta T$ in the interval $$\left[t_0 - \frac{T}{2}, t_1\right].$$

Figure 3:
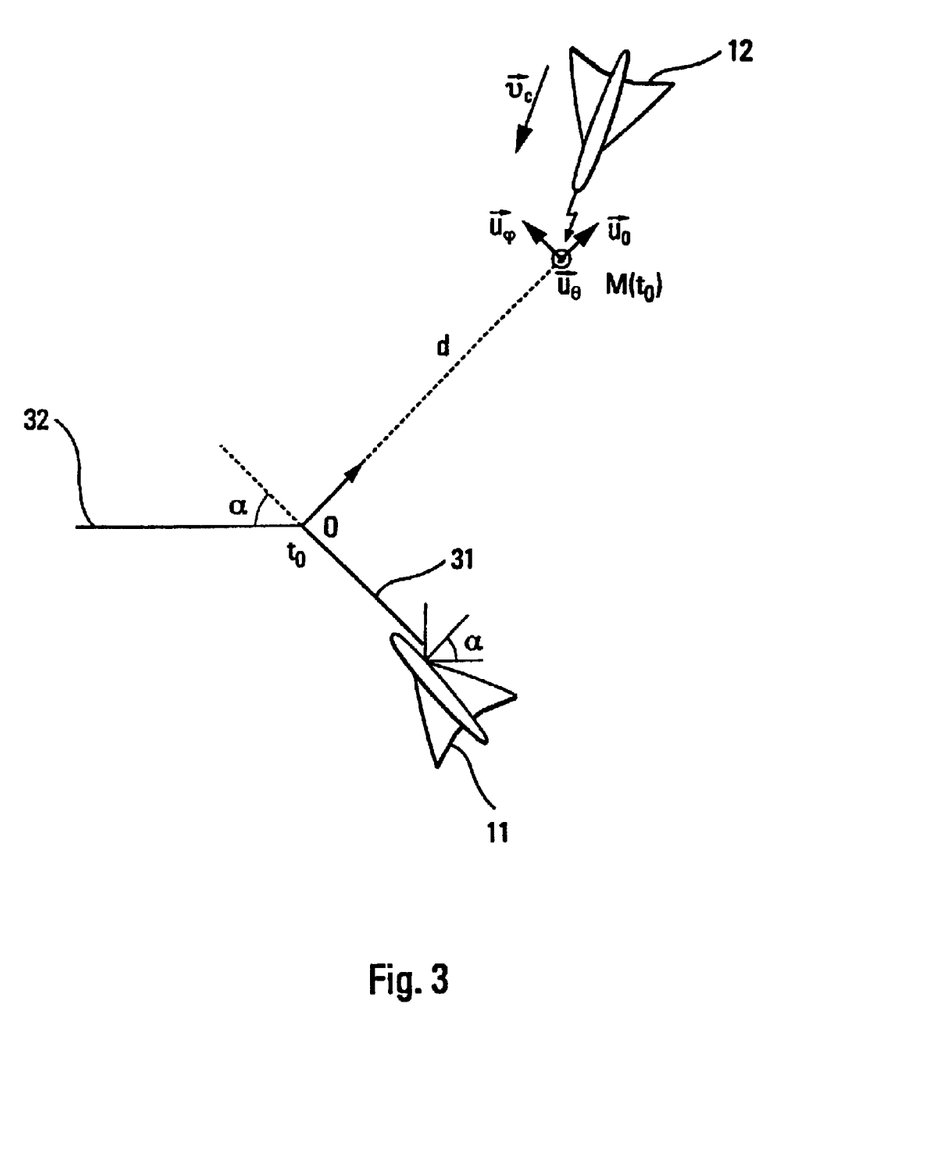
FIG. 3, illustration of the geometric coordinate system used.

FIG. 3 illustrates the axis system used to define the method according to the invention. In this axis system the target aircraft 12 is located by its spherical coordinates in the right handed Cartesian system $[\vec{u}_0, \vec{u}_\theta, \vec{u}_\varphi]$, where $\vec{u}_0$ represents the direction at instant $t_0$, of the carrier 11 to the target 12.

According to the invention, the observation trajectory of the carrier aircraft is ideally broken down into two trajectory segments 31 and 32 which can be considered to be line segments corresponding to two time intervals $$I_1 = \left[-\frac{T}{2}, t_1\right]$$

and $$I_2 = \left[t_2, \frac{T}{2}\right].$$

The interval $[t_1, t_2]$ contains the instant $t_0$ for which we are trying to estimate the target parameters.

To optimize the estimation, as mentioned previously, one of these segments, indicated by segment 32 on the figure, goes in direction $\vec{u}_\phi$ roughly perpendicular to the average direction $\vec{u}_0$ of propagation of the signal transmitted by the target.

Figure 4:
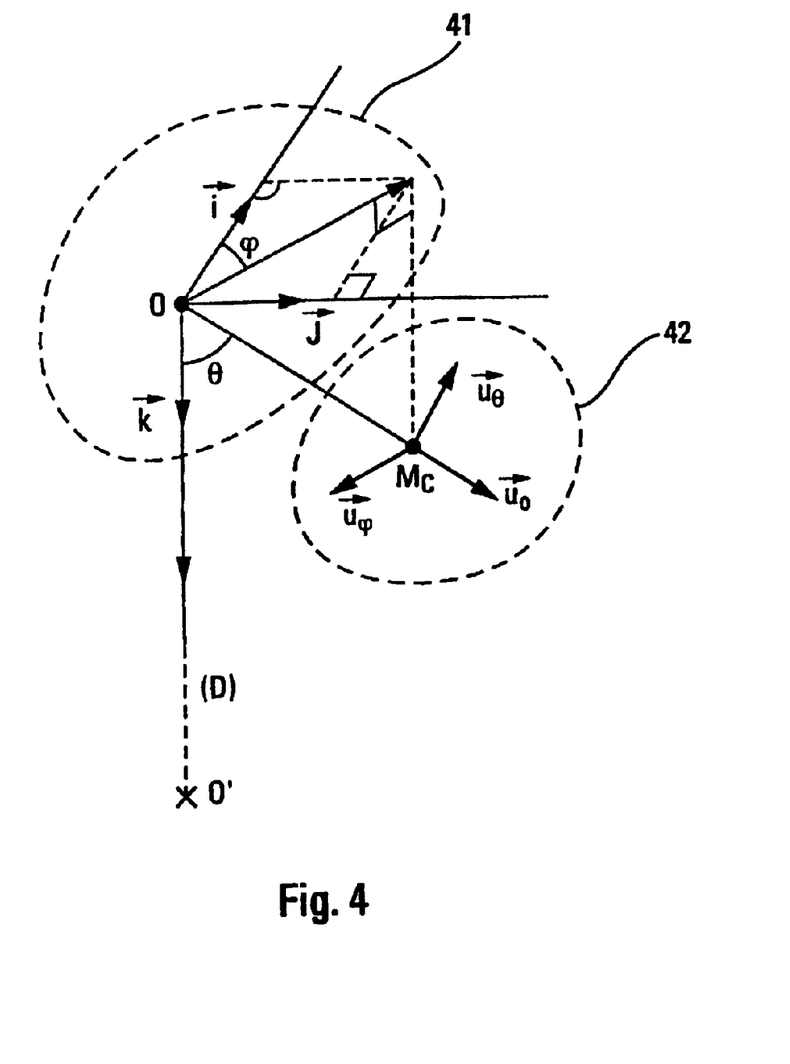
FIG. 4, a simultaneous representation of the two geometric coordinate systems.

FIG. 4 illustrates the change from a normal terrestrial coordinate system 41, using Cartesian coordinates, to a local system of spherical coordinates 42.

The normal terrestrial coordinate system 41 is defined, for example, by its origin O, middle point of the large base, and by the straight line D passing though O and orthogonal to the surface of the Earth. O' is the point of intersection of the line D with the surface of the Earth. The right handed Cartesian system $\{\vec{i}, \vec{j}, \vec{k}\}$ related to this coordinate system is for example defined as follows:

$\vec{k}$ is the vector carried by D and directed downwards $\vec{i}$ and $\vec{j}$ are two orthogonal vectors, located in the plane parallel to the horizontal plane, tangent to the Earth at O'. The directions of vectors $\vec{i}$ and $\vec{j}$ are North and East respectively.

The local coordinate system 42, is built from the Cartesian system $\{\vec{u}_0, \vec{u}_\theta, \vec{u}_\phi\}$ defined by:

$$\vec{u}_0 = \sin\theta\cos\varphi\vec{i} + \sin\theta\sin\varphi\vec{j} + \cos\theta\vec{k}$$

$$\vec{u}_\theta = \cos\theta\cos\varphi\vec{i} + \cos\theta\sin\varphi\vec{j} - \sin\theta\vec{k}$$

$$\vec{u}_\varphi = -\sin\varphi\vec{i} + \cos\varphi\vec{j}$$

where $\theta \in ]0, \pi[$ and $\phi \in [0, 2\pi[$.

In this coordinate system a vector $\vec{X}$ will be defined by its three components $X_r$, $X_\theta$, and $X_\phi$.

According to the invention, the measurements supplied by the large and small bases are modeled, initially, by the following relations:

$$(4)\begin{cases} \vec{\gamma}_{mes}(t) = \dfrac{\vec{u}_0 + \Delta\vec{u}_t}{\|\vec{u}_0 + \Delta\vec{u}_t\|} + \vec{w}(t) & (5) \\ \Delta^2\Phi^{LHI}(t) = 2\pi\left\{\vec{k}_t \cdot \dfrac{\vec{u}_0 + \Delta\vec{u}_t}{\|\vec{u}_0 + \Delta\vec{u}_t\|} - \vec{k}_0 \cdot \vec{u}_0\right\} + w'(t) - w'(t_0) \text{ modulo } 2\pi & (6) \end{cases}$$

Relation (5) models the expression of the measurements of the angular directions of the axis connecting the center of the large base of the carrier to the target.

Relation (6) models the change in phase difference, measured between the two sensors of the large base.

$\vec{u}_0$ represents, at instant $t_0$, the direction of the target from the center of the large base.

$\Delta\vec{u}_t$ represents the variation with time, of the target direction with respect to the center of the large base. It is expressed by the following relation:

$$\Delta\vec{u}_t = \frac{\vec{v}_c}{d} \cdot (t - t_0) - \frac{\Delta\vec{M}_t}{d}$$

with:

$\Delta\vec{M}_t = \overrightarrow{O(t_0)O(t)}$, the vector which corresponds to the carrier displacement during the time interval $[t_0, t]$, d, the distance separating the target and the center of the large base at instant $t_0$, $\vec{v}_c$, the speed vector of the target.

The vector $$\vec{k}_t = \frac{\vec{IJ}(t)}{\lambda_t}$$

characterizes the positions of the two sensors I and J of the large base. $\vec{k}_t$ is for example calculated from information supplied by the carrier inertia unit. $\lambda_t$ is the wavelength corresponding to this central frequency $f_t$ of the signal transmitted by the target, $f_t$ being determined elsewhere.

The terms $\vec{w}(t)$ and $w'$ represent Gaussian white noise.

In this system (4) the parameters concerning the target appear through expressions of $\vec{u}_0$ and $$\frac{1}{d}$$

for the position and expressions $$\frac{\vec{v}_c}{d}$$

for the speed.

By using a spherical coordinate system such as the one described previously, the quantities $$\vec{u}_0, \frac{1}{d} \text{ and } \frac{\vec{v}_c}{d}$$

can be re-expressed, in the form of a vector $\Theta$ with six components which define the speed and the Ia position of the target. $\Theta$ is expressed as:

$$\Theta = \left[\theta, \varphi, \frac{d_0}{d}, \frac{\tau_0 v_r}{d}, \frac{\tau_0 v_\theta}{d}, \frac{\tau_0 v_\varphi}{d}\right] \quad (7)$$

In this expression:

$v_r$, $v_\theta$ and $v_\phi$ are the target speed components $\vec{v}_c$ in the spherical coordinate system.

$d_0$ and $t_0$ are constants used to express $$\frac{1}{d}, \frac{v_r}{d}, \frac{v_\theta}{d} \text{ and } \frac{v_\varphi}{d}$$

as dimensionless numbers approximately equal to one.

A study carried out elsewhere shows that depending on the type of measurements taken, with the carrier moving in a horizontal plane, the vector $\vec{v}_c$ can only be accessed by its component $v_\varphi$. The components $v_r$ and $v_\theta$ cannot be correctly observed even with medium accuracy and it is best to give them a value a priori.

Since the value of the component $v_\theta$ is small, it can be set to zero.

In addition, if relations (5) and (6) are explained according to the vectors $\vec{u}_0$, $\vec{u}_\theta$ and $\vec{u}_\varphi$, the variation of component $v_r$ only appears in a second order term and does not represent a significant term. Consequently, high dispersion on $v_r$ does not cause a significant error on the estimation of the other parameters. It can therefore be given an estimated value determined with respect to the target speed module. For a speed of 250 m/s in module, a value of $v_r$ between 125 m/s and 250m/s, for example 175 m/s, represents a suitable value.

Model (4) can then be rewritten as follows:

$$(8) \begin{cases} \Delta\Phi^{SMBI}(t) = M_\Theta^{SMBI}(t) + w(t) & (9) \\ \Delta^2\Phi^{LBI}(t) = M_\Theta^{LBI}(t) + w'(t) - w'(t_0) & (10) \end{cases}$$

with:

$$\Delta\Phi^{SMBI}(t) = \vec{u}_\varphi \cdot \vec{\gamma}_{mes}(t)$$

$$M_\Theta^{SMBI}(t) = \vec{u}_\varphi \cdot \frac{\vec{u}_0 + \Delta\vec{u}_t}{\|\vec{u}_0 + \Delta\vec{u}_t\|}$$

$$M_\Theta^{LBI}(t) = 2\pi\left\{\vec{k}_t \cdot \frac{\vec{u}_0 + \Delta\vec{u}_t}{\|\vec{u}_0 + \Delta\vec{u}_t\|} - \vec{k}_0 \cdot \vec{u}_0\right\}$$

Since the parameters $v_r$ and $v_\theta$ are set a priori, the expression of $\Theta$ can be simplified to become:

$$\Theta = \left[\theta, \varphi, \frac{d_0}{d}, \frac{\tau_0 v_\varphi}{d}\right] \quad (11)$$

Similarly, the terms along $\vec{u}_0$ et $\vec{u}_\theta$ considered as known are included in the expression of $\Delta\vec{u}_t$ which becomes:

$$\Delta\vec{u}_t = \left(\frac{v_\varphi}{d} \cdot (t - t_0) - \frac{\Delta M_t^\varphi}{d}\right) \cdot \vec{u}_\varphi + \vec{U} \quad (12)$$

$$= \left(\frac{v_\varphi - v_p^\varphi}{d} \cdot (t - t_0)\right) \cdot \vec{u}_\varphi + \vec{U}$$

with:

$$-\Delta M_t^\varphi = \overrightarrow{O(t_0)O(t)} \cdot \vec{u}_\varphi = v_p^\varphi(t - t_0)$$

where $v_p^\Phi$ is the component along $\vec{u}_\varphi$ of the carrier speed.

$$\vec{U} = \left(\frac{v_r}{d} \cdot (t - t_0) - \frac{\Delta M_t^r}{d}\right) \cdot \vec{u}_0 + \left(\frac{v_\theta}{d} \cdot (t - t_0) - \frac{\Delta M_t^\theta}{d}\right) \cdot \vec{u}_\theta$$

where $v_r$ takes an indicative value and $v_\theta$ a null value.

Let $\alpha$ be the relative motion of the target in front of the carrier in the direction $\vec{u}_\varphi$. $\alpha$ is defined by:

$$\alpha = \frac{v_\varphi - v_p^\varphi}{d} = \frac{\tau_0 v_p^\varphi}{d} - \frac{\tau_0 v_p^\varphi}{d_0} \cdot \frac{d_0}{d} \quad (13)$$

We then obtain $$\Delta\vec{u}_t = \alpha \cdot \vec{u}_\varphi + \vec{U} \quad (14)$$

Model (8) can therefore be expressed in terms of $\alpha$ which is a linear combination of the components $$\frac{d_0}{d} \text{ and } \frac{\tau_0 v_\varphi}{d}$$

of vector $\Theta$.

To estimate the parameters $$\theta, \varphi, \frac{d_0}{d} \text{ and } \frac{\tau_0 v_\varphi}{d},$$

the method according to the invention comprises for example processing which consists of trying to find the values of $$\theta, \varphi, \frac{d_0}{d} \text{ and } \frac{\tau_0 v_\varphi}{d}$$

which minimize a statistical criterion $C(\Theta)$ function of $\Theta$. This statistical criterion which concerns the expression of model (8), reflects the resemblance with respect to the measurements of this chosen evolution model. This criterion is "least squares" type. Its expression is as follows:

$$C(\Theta) = \sum_n \frac{(\Delta\Phi^{SMBI}(t_n) - M_\Theta^{SMBI}(t_n))^2}{2\sigma_{SMBI}^2} - \quad (15)$$

$$\log \int \frac{(\Delta^2\Phi^{LBI}(t_n) - M_\Theta^{LBI}(t_n) + w_0[2\pi])}{2\sigma_{LBI}^2} \exp{-\frac{w_0^2}{2\sigma_{LBI}^2}} dw_0$$

where the variable $t_n$ represents the measurements instants taken on the intervals $$\left[t_0 - \frac{T}{2}, t_1\right]$$

and $$\left[t_2, t_0 + \frac{T}{2}\right].$$

This expression of the criterion $C(\Theta)$ is given as an indication, since more accurate modeling of the noise could lead to a different expression.

The search for values $$\theta, \varphi, \frac{d_0}{d} \text{ and } \frac{\tau_0 v_\varphi}{d}$$

which given a minimum value at $C(\Theta)$, must in principle be carried out by thorough and extensive exploration. With four parameters this search involves too many computations. The method according to the invention therefore adopts an estimation procedure involving two steps.

The first step consists of neglecting $\vec{U}$ and of considering relation (14) with $\vec{U} = \vec{0}$. The vector $\Delta \vec{u}_t$ is then equal to $\alpha \cdot \vec{u}_\varphi$. $C(\Theta)$ is evaluated according to $\alpha$ on each trajectory, by assigning parameters $\theta$ and $\varphi$ values determined elsewhere. This step is used to obtain a quick estimation of parameter $\alpha$ and therefore a first estimation $\hat{\Theta}$ of the vector $\Theta$. This estimation is obviously an approximation since vector $\vec{U}$ is taken equal to vector $\vec{0}$, the model being thereby simplified.

The parameter $\theta$, and to a lesser extent the parameter $\varphi$, can be estimated using measurements made by the small base. Moreover, the parameter $\theta$ is considered as determined in this way with sufficient accuracy to successfully estimate of the other parameters.

Thus, $\theta$ being considered as known, the parameter vector is further simplified to advantage:

$$\Theta = \left[\varphi, \frac{d_0}{d}, \frac{\tau_0 v_\varphi}{d}\right] \quad (16)$$

This estimation step benefits from the two independent measurements series obtained during the two sequences of the acquisition step.

On each interval $I_1$ and $I_2$ the model (8) can be written:

$$(17) \begin{cases} \Delta \Phi_t^{SMBI} = M_{\Theta,t}^{SMBI,i} + w(t) & (18) \\ \Delta^2 \Phi_t^{LBI} = M_{\Theta,t}^{LBI} + w'(t) - w'(t_i) & (19) \end{cases}$$

with:

$i \in \{1, 2\}$ $\Delta \Phi_{i,t}^{SMBI} = \vec{u}_{\varphi i} \cdot \vec{\gamma}_{mes}(t)$ $M_{\Theta_i,t}^{SMBI,i} = \vec{u}_{\varphi i} \cdot \dfrac{\vec{u}_i + \Delta \vec{u}_t^i}{\|\vec{u}_i + \Delta \vec{u}_t^i\|}$ $M_{\Theta_i,t}^{LBI,i} = 2\pi \left\{ \vec{k}_t \cdot \dfrac{\vec{u}_i + \Delta \vec{u}_t^i}{\|\vec{u}_i + \Delta \vec{u}_t^i\|} - \vec{k}_i \cdot \vec{u}_i \right\}$ $O(t_I)$ being the middle of the large base at $t_I$ and $\vec{u}_I$, $\varphi_I$, $d_I$ being respectively the direction, the bearing and the distance of the target with respect to this point.

We can also write:

$$\Delta \vec{u}_t^i = \left(\frac{v_{\varphi i}}{d_i}(t - t_i) - \frac{\Delta M_t^{\varphi i}}{d_i}\right) \cdot \vec{u}_{\varphi i} = \left(\frac{v_{\varphi i} - v_t}{d_i}(t - t_i)\right) \cdot \vec{u}_{\varphi i} \quad (20)$$

Where $v_i$ is the component along $\vec{u}_{\gamma u}$ of the carrier speed.

$\Delta \vec{u}_t^i$ being expressed according to relation 20, model 17 appears advantageously as being as simply being a function of two variable terms $\alpha_I$ and $\Phi_I$:

$$\alpha_i = \frac{\tau_0(v_{\varphi i} - v_t)}{d_i}$$

which characterizes the relative motion of the target in front of the carrier, $\varphi_i$ which is the value of the bearing.

The estimation of the target parameters is then reduced to a one-dimensional operation along $\vec{u}_\Phi$.

Moreover, we consider that there is no significant change in the target parameters throughout the duration of the measurements. We can therefore write:

$\varphi_1 \approx \varphi_2 \approx \varphi, d_1 \approx d_2 \approx d$ and $v_{\varphi 1} \approx v_{\varphi 2} \approx v_\varphi$.

We therefore obtain, by analyzing the two measurement sequences, the following two terms:

$$(20) \begin{cases} \alpha_1 = \dfrac{\tau_0(v_\varphi - v_1)}{d} = \dfrac{\tau_0 v_\varphi}{d} - \dfrac{\tau_0 v_1}{d_0} \dfrac{d_0}{d} \\ \alpha_2 = \dfrac{\tau_0(v_\varphi - v_2)}{d} = \dfrac{\tau_0 v_\varphi}{d} - \dfrac{\tau_0 v_2}{d_0} \dfrac{d_0}{d} \end{cases}$$

The first step consists of determining an initial estimation of the parameters sought.

An initial estimation $\hat{\varphi}_I$ of $\varphi_I$ is obtained from the measurements of the small base.

Estimations $\hat{\alpha}_1$ and $\hat{\alpha}_2$ of parameters $\alpha_1$ and $\alpha_2$ are obtained independently by searching for the minimum value of the criterion $C(\Theta)$ for each measurement instant $t$.

For the estimation $\hat{\alpha}_1$ of $\alpha_1$, we take for example the measurements of the sequence which takes place during the time interval $I_1$.

Similarly, for the estimation $\hat{\alpha}_2$ of $\alpha_2$, we take the measurements of the sequence which takes place during the time interval $I_2$.

Using the determination of two estimations $\hat{\alpha}_1$ and $\hat{\alpha}_2$ we can then obtain a linear system of two equations with two unknowns:

$$(21) \begin{cases} \hat{\alpha}_1 = \dfrac{\tau_0 v_\varphi}{d} - \dfrac{\tau_0 v_1}{d_0} \dfrac{d_0}{d} & (22) \\ \hat{\alpha}_2 = \dfrac{\tau_0 v_\varphi}{d} - \dfrac{\tau_0 v_2}{d_0} \dfrac{d_0}{d} & (23) \end{cases}$$

With $$\frac{\tau_0 v_\varphi}{d} \text{ and } \frac{d_0}{d}$$

as unknowns.

The values $\hat{\alpha}_1$ and $v_1$ and $\hat{\alpha}_2$ and $v_2$ result from two measurement sequences made according to different trajectories. Equations 22 and 23 are therefore two independent equations.

The estimations of $$\frac{\tau_0 v_\varphi}{d} \text{ and } \frac{d_0}{d}$$

are then obtained by solving the system (21).

During the first estimation step, we can for example perform the following operations:

An exploration of the values of $\phi_l$ around the measurement $\hat{\phi}_l$, supplied by the small base with an accuracy of ±1°. This exploration is carried out in steps of 0.1°.

An exploration of the values of $\alpha_l$ around zero over a hundred or so values within the interval [−2, +2], bearing in mind that the values of parameters $$\frac{\tau_0 v_\varphi}{d} \text{ and } \frac{d_0}{d}$$

are close to 1.

Advantageously, the solutions of this system represent a very good approximation of the parameters sought.

After this first step, which can be considered as sufficient, we therefore have a very good estimation of the components of vector Θ:

The elevation θ is determined, with sufficient accuracy, by the measurements of the small base SMBI, The bearing φ, also determined by the measurements of the small base, is improved during the procedure to minimize the criterion C(Θ), The parameters $$\frac{\tau_0 v_\varphi}{d} \text{ and } \frac{d_0}{d}$$

are determined by calculation from the estimations $\hat{\alpha}_1$ and $\hat{\alpha}_2$.

This first step which has just been described, can be followed by a second step to further improve the estimation of target parameters, especially as regards the bearing φ.

The second step consists of repeating the previous operation, considering the relation (14) as a whole. The vector $\Delta \vec{u}_t$ is then equal to $\alpha \cdot \vec{u}_\phi + \vec{U}$. We therefore evaluate C(Θ) according to all the initial parameters, but only in a restricted area around $\hat{\Theta}$, which involves a reasonable number of calculations. This neighborhood is located around values estimated during the first step.

During this second step, the values which minimize C(Θ) are determined directly according to $$\varphi, \frac{\tau_0 v_\varphi}{d} \text{ and } \frac{d_0}{d},$$

still giving parameter θ its value determined elsewhere. This determination also takes into account the measurement results not considered during the previous step, which is the case especially for the measurements made in the non-rectilinear portions of the trajectory in the neighborhood of $t_0$.

During the second estimation step, we can for example perform the following operations:

an exploration of the values of φ in steps of 0.05° around the value $\hat{\phi}$ obtained by the first step, an exploration of parameters $$\frac{\tau_0 v_\varphi}{d} \text{ and } \frac{d_0}{d}$$

with about a dozen values taken around $$\left(\frac{\tau_0 v_\varphi}{d}\right) \text{ and } \left(\frac{d_0}{d}\right)$$

estimated previously.

In this step we can also consider the vector $\Delta \vec{u}_t$ in its full expression, vector $\vec{U}$ no longer being constant. Vector $\Delta \vec{u}_t$ is then written:

$$\Delta \vec{u}_1 =$$

$$\left(\frac{v_\varphi - v_p^\varphi}{d} \cdot (t - t_0)\right) \cdot \vec{u}_\varphi + \left(\frac{v_\theta - v_p^\theta}{d} \cdot (t - t_0)\right) \cdot \vec{u}_\theta + \left(\frac{v_r - v_p^r}{d} \cdot (t - t_0)\right) \cdot \vec{u}_0$$

$v_\theta$, $v_r$, $v_p^\theta$ et $v_p^r$ being the respective components of the target and carrier speeds along $\vec{u}_\theta$, $\vec{u}_\varphi$.

By using the complete expression of $\Delta \vec{u}_t$ we can obtain an estimation of the values $v_\theta$ and $v_r$ starting from values fixed a priori.

In the description of the method according to the invention which has just been given the measurement acquisition step was described, to simplify understanding, with two measurement sequences. This number is obviously not limiting and the method can be considered with a larger number of sequences. Nevertheless, it must include at least two sequences as described in order to obtain two independent equations.

Equally, the description mentions the advantage of changing coordinate system, which simplifies the expression of the model according to the parameters sought. Obviously this description does not describe all the means used to simplify the expression of the model according to these parameters. Since the purpose of this simplification was to obtain, by using the measurements taken, a sufficient number of independent equations to determine the parameters sought, any solution leading to this result can be included in the method. Similarly, the use of a resemblance criterion other than that described may be considered.

The description of the method according to the invention was given above for the special case of air-air localization where the signal transmitted by the target is a narrow band signal. This method can of course be generalized to other cases and especially, for example, to the case of a frequency-agile signal.

In this case, the variation of the transmission frequency is no longer carried out in narrow band. Nevertheless, the method according to the invention remains advantageously applicable. The only difference is the expression of the evolution model of the phase difference measured on the large base. In this case, expression (8) is modified as follows:

$$(24) \begin{cases} \Delta \Phi^{SMBl}(t) = M_\Theta^{SMBl}(t) + w(t) & (12) \\ \Delta^2 \Phi^{LBl} = M_\Theta^{LBl}(t) + \Delta \varphi(f_t, f_{t_0}) + w'(t) - w'(t_0) & (25) \end{cases}$$

with:

$$\Delta \phi(f_t, f_{t_u}) = \delta \phi(f_t) - \delta \phi(f_{t_u}) \qquad (26)$$

In expression (26), the term $\Delta \phi(f_t, f_{t_u})$ represents the variation of the dephasing value, related to the two sensors of the large base, between the instant t considered and the reference instant $t_0$. This dephasing variation is directly due to the frequency variation of the signal transmitted by the target. The term $\delta\phi(f_t)$ used in the expression of $\Delta\Phi_t^{LBI}$ is therefore no longer assumed to be constant.

This modification of the model concerns a term which does not depend on the parameters sought. Consequently, it has no impact on the estimation principle. In addition, by taking preliminary calibration measures, it is possible to estimate for each instant t the value of the central frequency of the signal. This can then be stored in a table and used afterwards to calculate the corresponding value of $\Delta\phi(f_t, f_{t_u})$.

In some cases, the variation of transmission frequency occurs in an extremely wide range. It occurs in particular for a transmission using frequency hopping. In this case, the signal transmitted can no longer be considered as a narrow band signal. However, the signal received can be analyzed by using several filters with adjacent passbands. The total passband of the signal is then, for example, broken down into narrow frequency bands, which allows the method according to the invention to be used as it is.

Another application of the method, given as an example, is air-ground localization. In this special case, the target is for example a fixed land radar. The target displacement is then zero and consequently we have $v_\phi = 0$. The only remaining parameter which cannot be accessed directly using the dephasing measurements, is the distance d. The method according to the invention is therefore considerably simplified. Since the estimation of a single parameter only requires one series of measurements, there is no longer any need for the carrier aircraft to change trajectory.

In this case, the spherical coordinate system adopted in the method proves to be most suitable.

What is claimed is:

1. A method for the localization of a target on a target trajectory, and transmitting a variable frequency signal, the method comprising:

acquiring the variable frequency signal by a detection means on a moving platform on a following trajectory, the target trajectory and the following trajectory separated by a non-zero angle, said step of acquiring including at least two independent sequences, each sequence configured to obtain a series of measurements; and measurement processing, including statistical processing carried out on each of the at least two measurement series, the statistical processing configured to determine a predetermined set of target parameters, wherein one of the least two sequences corresponds to a trajectory perpendicular to a direction of arrival of the variable frequency signal from the target, said predetermined set of target parameters includes a target speed parameter and a distance parameter said target speed parameter and said distance parameter determined by solving a system of independent equations determined from a series of measurements, a first phase of the statistical processing produces a system of linear equations, and unknowns of the linear equation are $$\frac{1}{d} \text{ and } \frac{v_\varphi}{d},$$

d being the distance from the target to the moving platform and $v_\phi$ the component of the target speed which can be estimated.

2. The method according to claim 1, wherein the linear equations have the following form:

$$\hat{a}_1 = \frac{\tau_0 v_\varphi}{d} - \frac{\tau_0 v_i^P}{d_0} \frac{d_0}{d}$$

where i represents the number of the measurement sequence considered, $\hat{a}_i$, the value of the angle of motion of the moving platform in front of the target estimated using the measurement series taken during the sequence, $d_0$ and $\tau_o$ are constants, and $v_i^P$ the speed of the moving platform during this sequence.

3. The method according to claim 1, wherein the method further comprises:

detecting the variable frequency signal with sensors arranged along one of an axis of the moving platform and a direction perpendicular to said axis, said sensors being grouped to form large and small base interferometers.

4. The method according to claim 3, wherein phase information, extracted from the variable frequency signal transmitted by the target and received by the sensors of the large and small base interferometers, are modeled as follows:

$$\begin{cases} \Delta\Phi^{SMBI}(t) = M_\Theta^{SMBI}(t) + w(t) \\ \Delta^2\Phi^{LBI} = M_\Theta^{LBI}(t) + w'(t) - w'(t_0) \; [2\pi] \end{cases}$$

where $$\Theta = \left\{ \theta, \varphi, \frac{d_0}{d}, \frac{\tau_0 v_r}{d}, \frac{\tau_0 v_\theta}{d}, \frac{\tau_0 v_\varphi}{d} \right\}$$

represents a vector whose components correspond to said predetermined set of target parameters.

5. The method according to claim 1, wherein the statistical processing configured to determine values of the predetermined set of target parameters which minimize a statistical resemblance criterion $C(\Phi)$.

6. The method according to claim 5, wherein the statistical resemblance criterion $C(\Phi)$ is expressed in the following form:

$$C(\Theta) = \frac{\sum_n (\Delta\Phi^{SMBI}(t_n) - M_\Theta^{SMBI}(t_n))^2}{2\sigma_{SMBI}^2} - \log \int \frac{(\Delta^2\Phi^{LBI}(t_n) - M_\Theta^{LBI}(t_n) + w_0[2\pi])}{2\sigma_{LBI}^2} \exp - \frac{w_0^2}{2\sigma_{LBI}^2} dw_0$$

where the variable $t_n$ represents measurements instants taken on the intervals $$\left[ t_0 - \frac{T}{2}, t_1 \right] \text{ and } \left[ t_2, t_0 + \frac{T}{2} \right].$$

7. The method according to claim 1, wherein the statistical processing of the measurement processing step is a first statistical processing procedure, and the measurement processing step includes a second statistical processing procedure, the statistical processing procedure configured to obtain a quick estimation using measurements taken during each of the sequences, and the second statistical processing configured to provide a more detailed estimate around the quick estimation, the more detailed estimate including all measurements available.

* * * * *